United States Patent [19]

Jones

[11] Patent Number: 5,072,340

[45] Date of Patent: Dec. 10, 1991

[54] SIGNAL LAMPS VISIBLE TO DRIVER

[76] Inventor: Isiah Jones, 1600 Rutledge Ave., Jacksonville, Fla. 32208-3750

[21] Appl. No.: 674,776

[22] Filed: Mar. 25, 1991

[51] Int. Cl.$^5$ .............................................. B60Q 1/26
[52] U.S. Cl. ........................................ 362/80; 362/83
[58] Field of Search ................... 340/475; 362/801, 83, 362/83.3, 234, 61

[56] References Cited

U.S. PATENT DOCUMENTS 2,113,919  4/1938  Korematsu ....................... 362/83 X
3,175,186  3/1965  Barenyi ............................ 362/80 X Primary Examiner—Stephen F. Husar
Attorney, Agent, or Firm—Richard C. Litman

[57] ABSTRACT

A system of signal lamps for an auto or truck places the lamps where they are visible to the driver of the vehicle, as well as to the drivers of other vehicles. The lamps act as running lights and turn signal lights. The system comprises four omnidirectional, surface-mounted signal lamps. These are mounted in two pairs: an amber front pair and a red rear pair. The front pair is located on that surface of the vehicle which is the front-most upper surface of the vehicle where they are within the view of the driver. These front lamps alert the driver to the lamp condition directly, and also warn other motorists. The rear pair is side-mounted, in places where the driver can see each rear lamp in one of the side-view mirrors. these locations make the lamps highly visible to the driver, because they are visible in regions where the driver habitually looks, and because they are angularly close to the normal view straight ahead. They are more visible to other drivers, as well, both because they are omnidirectional and because they are located higher than ordinary lamps, and so are less likely to be hidden when vehicles are very close to one another. The system may be installed as original equipment or added onto an existing vehicle as accessories.

8 Claims, 1 Drawing Sheet

SIGNAL LAMPS VISIBLE TO DRIVER

FIELD OF THE INVENTION

The present invention relates to motor vehicle lamps used as running lights, parking lights, turn signals, stop lights, etc.

DESCRIPTION OF THE PRIOR ART

Various motor vehicle signal lamp arrangements are known in the prior art.

Vehicles usually have lamps used for running lights, parking lights, turn signals, stop lights, and so on, located roughly at knee level on the four outer corners of the vehicle. (Most vehicles used on the roads are generally rectangular in outline and boxy in shape.) As a result of their placement, they are invisible to the driver of the vehicle and may be invisible to the drivers of other vehicles, depending on the situation.

Various U.S. patents have dealt with such lamps.

J. R. Haines, in U.S. Pat. No. 2,062,993, shows a streamlined or bullet-shaped turn and parking lamp for automobiles. The housing is attached to a pedestal for mounting onto an automobile's fender. The lamp includes internal light bulbs to provide light. The housing has apertures with translucent windows, the apertures being in the shape of arrows to indicate turning direction.

F. W. Oldenburg, in U.S. Pat. No. 2,825,888 shows wrap-around turn signal lamps which continue around the outer corners of a vehicle. The lamps include arrow indicia for indicating turning directions.

H. A. Pezzopane, in U.S. Pat. No. 3,017,500, shows a turn signal lamp for intermittently illuminating the tires of vehicles when the lamps are flashing. Pezzopane uses a lamp mounted through the generally vertical part of an automobile fender which is directly above each wheel. In addition to the usual internal light bulb and outward-facing lens, the lamp includes a portion protruding into the space behind the fender. This portion is generally cylindrical, and includes a window on its lower side. The light bulb is located within the cylinder; it illuminates the tire through the window at the same time that it visibly flashes through the lens. The four Pezzopane lamps are intended to make the car more visible to other drivers by making the tires more visible.

Pfeiffer et al., in U.S. Pat. No. 4,268,892, shows rear automobile turn and stop lights employing a plastic lens, which lens is formed with staggered offset sections. Each section includes a surface parallel to the direction of motion of the automobile.

T. Ornas, Jr. et al. in U.S. Pat. No. 3,430,229 show fender-mounted lamps which include two large lenses facing to the vehicle front and rear, and a smaller side lens. Such lamps are commercially available and often are used on trucks. Their advantage is that a single lamp functions to alert drivers to both the rear and the front of the vehicle.

J. P. Bell, in U.S. Pat. No. 3,454,757, teaches the use of a single pair of side lamps. The lamps are surface mounted on the fender between the front door and the front wheel, on either side of the automobile. The two lamps are intended to alert the driver of another vehicle when he or she is in the "blind spot" of the automobile with the side lamps. This idea is less applicable today, because many vehicles now have "wraparound" lamps.

Wilbur Brandt, in U.S. Pat. No. 4,613,927, teaches the use of a reduced-scale model of an automobile, the model having a complete set of turn, stop and backup lights. This model is mounted on the rear deck of an actual automobile as an aid to drivers behind. The model's lights are wired into the electrical system of the real automobile, and operate simultaneously with the real automobile's lights.

B. Barenyi describes a set of warning lights for safety in stopped or disabled automobiles, in U.S. Pat. No. 3,175,186. The invention is intended to let other motorists see safety parking lamps when the hood and/or the trunk (rear storage compartment) lid of an automobile are raised. Barenyi uses four lamps, which are mounted on the surface of the hood and the trunk lid. The lamps are disposed at the outer corners of the hood and trunk lid. Each lamp includes two portions, one above and one below the surface, mounted on either side of openings made through the sheet metal. Each portion has a cover and bulb. The effect is the same as if eight separate lamps were mounted, inside and out, at the extreme outer rear corners of the trunk lid and at extreme outer front corners of the hood. The inner four lamps also function to illuminate the engine compartment and/or the rear storage space.

Barenyi's lamps are mounted only on the ends of the hood and lid, which can be raised. They are not placed on the side walls of the automobile, as Barenyi states in Col. 1, lines 47–50.

None of the above inventions and patents, taken either singly or in combination, is seen to describe the instant invention as claimed.

None of the above patents discloses any arrangement of vehicle signal lamps adapted to be visible to the driver of that vehicle. All the above patents describe systems which are intended to be visible to drivers of other vehicles.

Neither do any of the above patents, nor commercially available vehicles, teach the location of lamps as high as possible so as to be visible when vehicles are crowded close together.

Accordingly, one object of the present invention is an arrangement of vehicle signal lamps adapted to be visible to the driver of that vehicle, so that the driver will be aware of the state of the signal lights without effort.

Another object is an arrangement of vehicle signal lamps adapted to be visible to the drivers of other vehicles, in addition to the driver of vehicle mounting the lamps.

A further object is lamps which are simple in construction, easy to mount, and which are omnidirectional.

A final object is lamps mounted as high as possible for good visibility.

These and other objects of the present invention will become readily apparent upon further review of the following specification and drawings.

SUMMARY OF THE INVENTION

The present invention is a system of signal lamps for an automobile, truck, or other vehicle, which are visible to the driver of the vehicle and also to the drivers of other vehicles. The lamps which act as running lights and turn signal lights.

The system may be installed as original equipment, or added onto an existing automobile or truck as accessories.

The system comprises four omnidirectional, surface-mounted signal lamps. These are mounted in two pairs: a forward or front pair and a rear pair.

The front pair is located on that surface of the automobile or truck which is the front-most upper surface of the automobile where they are within the view of the driver. These front lamps alert the driver to the lamp condition directly.

The rear pair is side-mounted, in places where the driver can see each rear lamp in one of the side rear-view mirrors.

The locations described above make the lamps highly visible to the driver, because they are visible in regions where the driver habitually looks, because they are angularly close to the normal view straight ahead, and because they are bright.

They are also more visible to other drivers, as well, both because they are omnidirectional and because they are located higher than ordinary lamps. This means they are less likely to be hidden in heavy traffic, when vehicles are very close to one another. The lamps also act as additional lamps for increased visibility to other drivers, when installed as accessories to augment the regular lights.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention comprises a system of four signal lamps for an automobile or truck.

Figure 1:
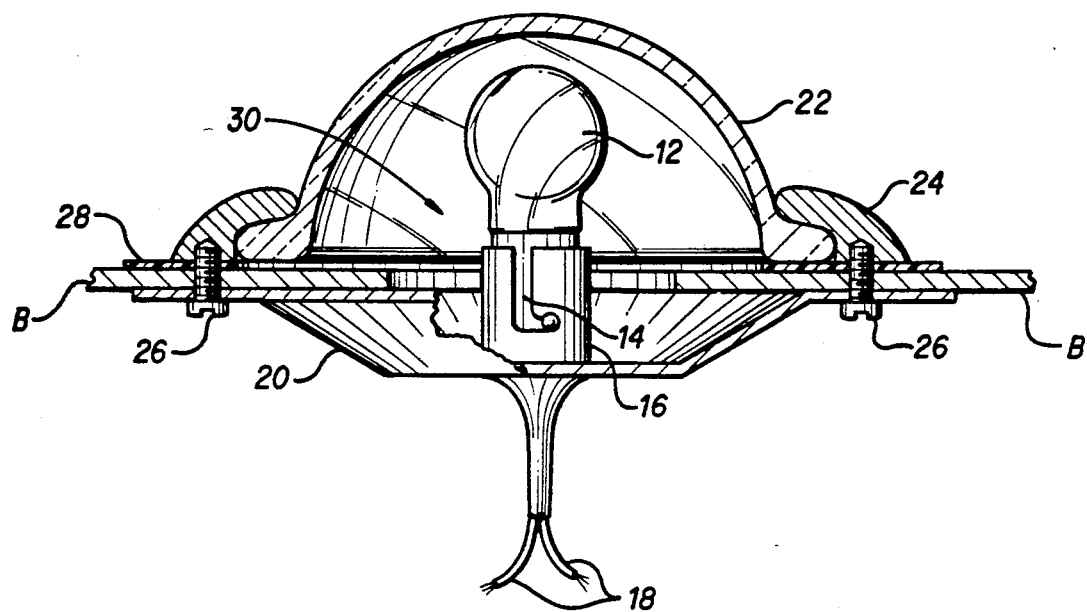
FIG. 1 is a view partially cut away to a cross section, showing a lamp of the invention.

Each lamp 10 comprises a housing and a replaceable bulb 12, shown in FIG. 1. The incandescent light bulb 12 is centrally disposed within a generally hemispherical cover 22, which is transparent or translucent so as to pass the light from the bulb 12.

Preferably each lamp 10 is omnidirectional, meaning that when the lamp is mounted onto a surface the lamp will emit light into space in all directions which do not hit the surface. This allows for visibility in all horizontal directions as well as upward, which is important when another driver is above the automobile (as in the case of a truck driver whose truck is close to the automobile). The bulb 12 will be visible through the cover 22 in all directions if properly placed.

Herein, the word "omnidirectional" more generally refers to lamps which emit light in all directions away from a surface horizontally, but within a substantial but limited angle vertically; for example, a lamp which emits light into a volume bounded by two cones sharing an apex point and an axis of rotation, where the volume inside the cones is lightless and the lamp is located at the common apex of the cones. A signal lamp need emit no light directly downward, for example, and so the light may be increased in other directions at the expense of vertically steep directions where no observer is likely to be.

The incandescent light bulb 12 is preferably of the usual signal lamp type, 12-volt with a bayonet base 14. The bulb may include single or multiple filaments so as to function as a combination running light and turn signal light.

The base 14 of the bulb 12 fits within a socket 16 adapted to accept the base 14. The socket 16 is welded to a metal bracket 20, which in the embodiment shown is a cup-shaped stamped piece. Electrodes or contacts (not shown) within the socket 16 bear against terminals of the bulb base 14 to pass electric current into the filament of the bulb 12 from wires 18 (shown extending from the lower portion of the housing). The base 14, socket 16, bracket 20 and automobile body sheet metal B act as electrical ground connections for the current, which leaves the filament of the bulb 12 and returns to the vehicle battery (not shown).

The cover 22 is held onto the surface of the sheet metal B, and also located to the bracket 20, by a circular shaped rim 24 and screws 26. The rim 24 fits over the flanged edge of the cover 22. Screws 26 pass through aligned holes in the bracket 20 and the body B into tapped holes in the rim 24. (The screws 26 may be of the self-tapping variety.) To prevent rain leaks and corrosion, a gasket 28 is disposed between the rim 24 and the sheet metal B.

The socket 16 is disposed within a circular hole 30 through the sheet metal of the body B. If the present invention is to be a kit or accessory, a hole of such a diameter may be inconvenient. In this case the illustrated housing can be redesigned so that only the wires 18 and the screws 26 need to pass through the sheet metal of the body B.

The housing may be made of any suitable materials. For example, the bracket 20 might be coated steel, the rim 24 cast zinc or molded plastic, the cover 22 glass or plastic. The cover 22 may be either clear or colored, and may include frosting or surface patterns to act as a Fresnel lens, diffusers, or reflectors.

Figure 2:
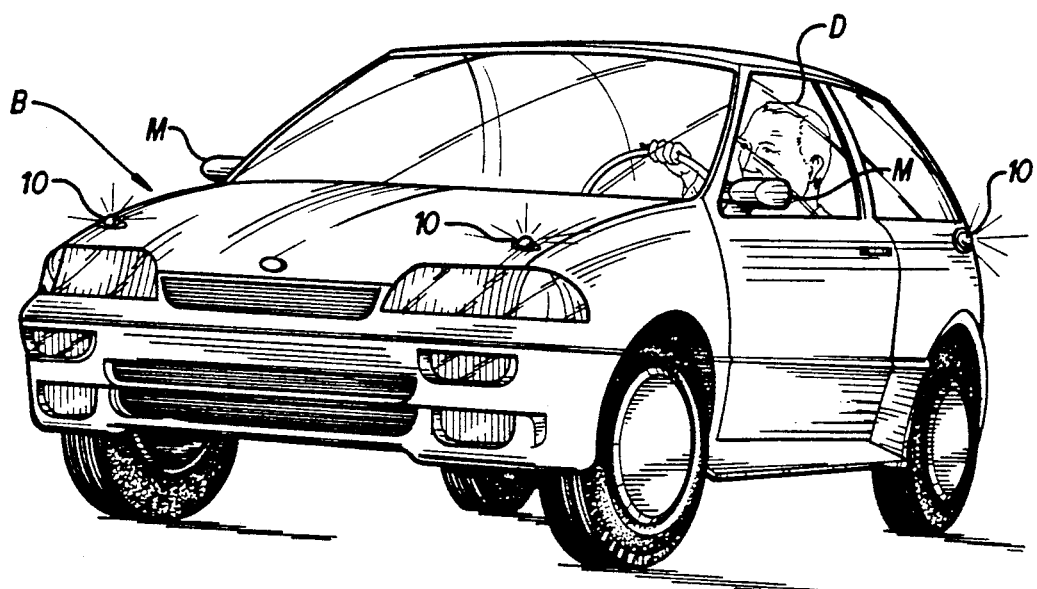
FIG. 2 shows an automobile or truck with the lamps disposed in positions where they are visible to the driver, who is shown within the automobile.

The lamps 10 are shown mounted on the surface of the body B of an automobile in FIG. 2. There are four lamps 10, arranged in two pairs: a front pair and a rear pair. The lamps 10 of either pair are placed symmetrically across the plane of symmetry of the automobile body B.

Ordinarily the front lamps will be amber and the rear lamps red. The covers 22 may be colored accordingly, or colored bulbs 12 may be used.

The embodiment of FIG. 2 is an accessory embodiment. The lamps 10 are shown on an automobile which already is equipped with signal lights.

The front pair of lamps 10 is placed so as to be directly visible to the driver D, shown within the automobile. These two front lamps 10 are also placed well forward, and as high up as they possibly can be given the shape of the automobile. They may be mounted on the hood, on the fender adjacent the hood, or otherwise, in accordance with the above conditions.

The rear pair is placed on the flanks of the body B where they are indirectly visible to the driver in the rear-view mirrors M; they are also placed high up for visibility to others in crowded traffic. These two conditions will naturally occur together, since the mirrors are relatively high and their view is directed backward in a generally horizontal direction.

The lamps 10 may be wired just as ordinary running lights and turn signal lights are, or, if the lamps 10 are added as accessories, they may be wired in parallel with the original lights.

The placement of the lamps as shown has distinct advantages over the usual placement.

One advantage is that the lamps 10 are higher than is typical, which makes for much better visibility of the lamps to drivers of other vehicles. Some vehicles are much taller than others, and the high placement, combined with the omnidirectional nature of the lamps 10, means that even the driver of an 18-wheel truck can easily see the lamps on a compact car which is close by, if the compact car is equipped with the lamps of the present invention. And, even if another vehicle is no taller than the automobile equipped with the lamps of the present invention, the visibility is still increased in the extremely crowded driving conditions common today, in which cars are often literally bumper-to-bumper.

A second advantage is the driver can see the lamps directly, and so will not fail to notice the bright flashing of the turn signals; and the driver can also easily check to see that the running lights are on.

Usually the driver has no way at all to check that the running lights have not failed; the only method is to get out of the car, and walk around it to see if the lamps are lighted. This, of course, is seldom done, so the danger from defective lights is increased. With the present invention, the driver needs only to glance ahead or into the rear-view mirrors to check the running lights.

The danger of leaving on a turn signal after the turn is made is also greatly diminished, because the flashing lamps 10 are both much brighter and much closer to the driver's line of sight than are the small turn lamps of the dashboard. Moreover, drivers habitually check their rear-view mirrors.

The lamps of the present invention may be used solely as running or parking lights, solely as turn signals, or as a combination of the two. The combination may be made by the use of a two-filament bulb as illustrated in the drawing FIG. 1, by employing two bulbs within the housing, by doubled adjacent lamps 10, or by intermittently flashing the running lights off when signaling a turn. Thus the lamps may be lighted with constant intensity, with intermittently varying intensity, or intermittently, to indicate position or the turning motion intended. Stop lights may also be incorporated in any of the above-listed ways, or in other ways. (In the following claims, "lamp" means a closely adjacent pair of lamps, as well as a single lamp.)

In the following claims, "left" means the side of a vehicle which is on the left when facing in the direction of motion; "right" conversely means the other side. Put otherwise, "left" is port and "right" is starboard.

It is to be understood that the present invention is not limited to the sole embodiment described above, but encompasses any and all embodiments within the scope of the following claims.

I claim:

1. In a vehicle having a bilaterally symmetrical body, the body including an outer surface, a front end and a rear end, the vehicle having an operating position for a driver and at least one rear-view mirror for the driver to see toward the rear end, portions of the surface visible to the driver when the driver is in the operating position, the improvement comprising:
    a pair of front lamps symmetrically disposed on front positions of the outer surface adjacent the front end, said front lamps directly visible to the driver, said front lamps adapted to light continuously, intermittently, or with varying intensity to indicate position or intended motion of the vehicle;
    a pair of rear lamps symmetrically disposed on rear positions of the outer surface adjacent the rear end, said rear lamps indirectly visible to the driver in respective ones of the mirrors, said rear lamps adapted to light continuously, intermittently, or with varying intensity to indicate position or intended motion of the vehicle; whereby
    the driver may see said front lamps and at least one of said rear lamps from the operating position while driving the vehicle.

2. A vehicle as in claim 1 wherein said front lamps and said rear lamps are omnidirectional.

3. A vehicle as in claim 1 wherein said front lamps are adapted to emit a first color of light and said rear lamps are adapted to emit a second color of light.

4. A vehicle having a body including:
    a generally horizontal left upper front surface;
    a generally horizontal right upper front surface;
    a generally vertical left rear side surface;
    a generally vertical right rear side surface;
    a left front lamp disposed on said left upper front surface;
    a right front lamp disposed on said right upper front surface;
    a left rear lamp disposed on said left rear side surfaces;
    a right rear lamp disposed on said right rear side surfaces; and
    means to light the lamps continuously, intermittently, or with varying intensity to indicate position or intended motion of the vehicle.

5. A vehicle as in claim 4 wherein the lamps are omnidirectional.

6. A vehicle as in claim 4 wherein
    said left front lamp and said right front lamp emit a first color of light and said left rear lamp and said right rear lamp emit a second color of light.

7. A vehicle having a body including:
    a left upper front surface;
    a right upper front surface;
    a left rear side surfaces;
    a right rear side surfaces;
    a left front lamp disposed on said left upper front surface;
    a right front lamp disposed on said right upper front surface;
    a left rear lamp disposed on said left rear side surfaces;
    a right rear lamp disposed on said right rear side surfaces;
    means to light the lamps continuously, intermittently, or with varying intensity to indicate position or intended motion of the vehicle;
    said vehicle including a rear-view mirror and an operating position for a driver, and wherein said left front lamp and said right front lamp are directly visible to the driver, and said left rear lamp is indirectly visible to the driver in said mirror.

8. A vehicle as in claim 7, including a second rear-view mirror, and wherein said right rear lamp is indirectly visible to the driver in said second rear-view mirror.

* * * * *